United States Patent
Slonim et al.

(10) Patent No.: US 7,451,422 B1
(45) Date of Patent: Nov. 11, 2008

(54) SIMULTANEOUS ASSIGNMENT OF SELECT I/O OBJECTS AND CLOCK I/O OBJECTS TO BANKS USING INTEGER LINEAR PROGRAMMING

(75) Inventors: Victor Z. Slonim, Broomfield, CO (US); Parivallal Kannan, Longmont, CO (US); Salim Abid, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 275 days.

(21) Appl. No.: 11/500,524

(22) Filed: Aug. 8, 2006

(51) Int. Cl.
*G06F 17/50* (2006.01)
(52) U.S. Cl. .......................................... 716/16; 716/10
(58) Field of Classification Search .................. 716/2, 716/4–5, 10, 16–17
See application file for complete search history.

(56) References Cited

U.S. PATENT DOCUMENTS

| | | | |
|---|---|---|---|
| 7,111,265 B1 | 9/2006 | Tan et al. | |
| 7,203,916 B2 | 4/2007 | Dotson et al. | |
| 7,266,789 B2 | 9/2007 | Chung-Maloney et al. | |
| 7,299,439 B1 * | 11/2007 | Slonim et al. | 716/10 |
| 2004/0225982 A1 | 11/2004 | Donelly et al. | |
| 2004/0230922 A1 | 11/2004 | Allen et al. | |
| 2007/0204252 A1 * | 8/2007 | Furnish et al. | 716/10 |

OTHER PUBLICATIONS

Xilinx, Inc.; U.S. Appl. No. 11/135,980, Slonim et al., May 24, 2005.
Xilinx, Inc.; U.S. Appl. No. 11/501,155, Slonim et al., Aug. 8, 2006.

* cited by examiner

*Primary Examiner*—Stacy A Whitmore
(74) *Attorney, Agent, or Firm*—Kevin Cuenot

(57) ABSTRACT

A method of assigning I/O objects to banks of a target device can include concurrently assigning I/O objects, including select I/O objects and clock I/O objects, of the circuit design to I/O groups according to an I/O standard associated with each I/O object. Each I/O group can include only I/O objects of a same I/O standard. The method also can include establishing a plurality of linear constraints for regulating assignment of the I/O groups to banks of the target device. The linear constraints can include range constraints indicating I/O banks capable of hosting clock I/O objects. The method also can include defining mutual relationships among selected ones of the linear constraints. An indication as to whether a feasible solution exists for assignment of the I/O groups to banks of the target device can be provided by minimizing a linear objective function while observing the linear constraints and the mutual relationships.

20 Claims, 4 Drawing Sheets

SIMULTANEOUS ASSIGNMENT OF SELECT I/O OBJECTS AND CLOCK I/O OBJECTS TO BANKS USING INTEGER LINEAR PROGRAMMING

BACKGROUND

1. Field of the Invention

This invention relates to the field of integrated circuits and, more particularly, to the assignment of input/output objects to input/output banks of an integrated circuit.

2. Description of the Related Art

Modern integrated circuits are capable of supporting a variety of different input/output (I/O) standards. Examples of I/O standards can include, but are not limited to, different varieties of Gunning Transceiver Logic (GTL) signaling such as GTL, GTL_DCI, and GTLP_DCI, Low Voltage Differential Signaling LVDS25, LVCMOS25, and the like. Each of these I/O standards specifies a set of attributes such as whether a reference voltage $V_{REF}$ is necessary, the value of any required $V_{REF}$, whether a voltage supply $V_{CC}$ is needed for input ($V_{CCI}$) or output ($V_{CCO}$), and/or the value of any required $V_{CCI}$ or $V_{CCO}$. This listing of I/O standards and attributes is not intended to be exhaustive, but rather illustrative of the many varieties of I/O standards and corresponding attributes.

Most modern programmable logic devices (PLDs) organize I/O objects of a circuit design into a limited number of physical I/O banks (banks) on the PLD. A PLD, such as a field programmable gate array (FPGA), can include 8 banks, although this number is not definitive of every type of PLD as different PLDs can include different numbers of banks. In any case, each bank can be associated with a plurality of different I/O objects. The I/O objects that are assigned to a given bank must be configured according to compatible I/O standards. As such, the placement of I/O objects into a given bank can be said to be constrained by the organization of that bank. In illustration, some I/O standards require a specific $V_{CCI}$ or $V_{CCO}$. A bank typically has a single $V_{CC}$ supply. Accordingly, only I/O objects configured according to I/O standards that have compatible $V_{CC}$ requirements can be assigned to the same bank. Other attributes of I/O standards serve to further restrict the set of banks to which a given I/O object can be assigned.

The I/O objects of a circuit design can be formally divided into two or more subsets based upon the main purpose and constraints applied to each I/O object. In particular, some I/O objects provide signals to the logic core objects while others feed local and global clocks in the circuit design. These objects can be classified into groups called the select I/O subsystem and the clock I/O subsystem respectively. The main purpose of such classification is to reflect that banking rules imposed on I/O objects as well as the preferences relating to the placement of I/O objects can be different for each group.

Within an FPGA, for example, clock I/O objects drive global and local clock buffers in the device. The buffers, in turn, drive special global and local clocking resources which also are referred to as the clock-spine, clock-network, low-skew network, etc. For performance reasons, the global and local clock buffers are associated with some special I/O sites, referred to as dedicated clock I/O sites. The clock I/O objects in the circuit design may only be placed on these special, dedicated clock I/O sites. All other I/O banks on the device are not permitted to be occupied by these clock I/O objects.

The placement of I/O objects, whether select I/O or clock I/O objects, is governed by a variety of other constraints as well. One type of constraint is called a range constraint. A range constraint specifies that an I/O object has to be placed within a given region or set of banks of the target device. It should be appreciated that the region or the set of banks includes a set of I/O sites on the target device. Range constraints may be imposed by users or computer aided design (CAD) tools.

Another type of constraint is called a location constraint. A location constraint specifies that an I/O object has to be placed on a specific I/O site. Location constraints typically are user imposed and stem from an external requirement relating to, for example, printed circuit board (PCB) layout. Still, locate constraints can be imposed by CAD tools for other reasons which can include performance, routability, and runtime.

Yet another type of constraint pertains to what are called "relationally placed macros" (RPMs). An RPM is a group of select I/O and/or clock I/O objects that must be assigned to an I/O bank as a whole, without separation. Splitting an RPM into different I/O banks is forbidden and usually results in an unroutable placement. An RPM integrity constraint can be associated with I/O objects that are members of an RPM to indicate this condition. RPM integrity constraints can be put into effect by users or CAD tools for reasons including, but not limited to, performance, device restrictions, routability, runtime, and I/O standards.

The task of assigning I/O objects to banks is commonly referred to as the "Select I/O placement problem". Past techniques for solving the select I/O placement problem have relied upon heuristics to automate I/O placement. One heuristic-based approach utilizes a combination of simulated annealing, bipartite matching, and constructive bin-packing to find a solution. Heuristic-based techniques, however, do have disadvantages. In particular, heuristic-driven techniques are not guaranteed to determine a feasible I/O placement solution despite the existence of such a solution. Further, heuristic techniques are not capable of identifying an inherently infeasible circuit design.

Another proposed solution for the I/O placement problem relies upon an Integer Linear Programming (ILP) formulation of the problem. This solution seeks to overcome the uncertainties inherent to heuristic approaches discussed above. The ILP model includes provisions for addressing voltage constraints when assigning I/O objects to physical banks. Other attributes of I/O standards, however, are not addressed. Reformulation of the ILP model to accommodate additional I/O standard attributes is not a trivial undertaking.

It would be beneficial to perform I/O placement in a manner which overcomes the limitations described above.

SUMMARY OF THE INVENTION

The present invention provides a solution for evaluating the feasibility of a circuit design with respect to input/output (I/O) assignment. One embodiment of the present invention can include a method of assigning I/O objects to banks of a target device. The method can include concurrently assigning I/O objects, including select I/O objects and clock I/O objects, of the circuit design to I/O groups according to an I/O standard associated with each I/O object. Each I/O group can include only I/O objects of a same I/O standard. The method also can include establishing a plurality of linear constraints for regulating assignment of the I/O groups to banks of the target device. The linear constraints can include range constraints indicating I/O banks capable of hosting clock I/O objects. The method can include defining mutual relationships among selected ones of the linear constraints. An indication as to whether a feasible solution exists for assignment of the I/O groups to banks of the target device can be provided by minimizing a linear objective function while observing the linear constraints and the mutual relationships.

Establishing a plurality of linear constraints can include defining at least one location constraint for an I/O group that indicates a position to which an I/O object of the I/O group is to be assigned within a selected bank of the target device. Establishing a plurality of linear constraints further can include defining at least one location constraint for an I/O group that indicates a position to which a clock I/O object of the I/O group is to be assigned within a selected bank of the target device.

In the case where the plurality of linear constraints includes a capacity constraint for a selected bank, the method can include classifying I/O objects assigned to a position of the selected bank as locked I/O objects, determining a number of locked I/O objects for the selected bank, and modifying the capacity constraint by decreasing available capacity of the selected bank by the number of locked I/O objects for the selected bank.

In the case where the I/O standard for each I/O object specifies a range constraint type indicating a set of banks of the target device allowed to host I/O objects of that range constraint type, concurrently assigning I/O objects can include assigning I/O objects to I/O groups such that each I/O group includes only I/O objects having a same range constraint type. A measure of capacity, a bank color assignment variable, and a group assignment variable, relating to a selected I/O group, can be set to zero for each bank that is not allowed to host the selected I/O group.

In the case where the I/O standard for each I/O object specifies a relationally placed macro (RPM) constraint type, concurrently assigning I/O objects can include assigning I/O objects to I/O groups such that each I/O group includes only I/O objects having a same RPM constraint type. The RPM constraint type can indicate a number of I/O objects within an RPM group. The method further can include limiting a measure of capacity of a bank to receive an RPM group according to a weighting factor that depends upon the RPM constraint type.

Another embodiment of the present invention can include a method of assigning I/O objects to banks of a target device. The method can include specifying I/O standards to include a range constraint type indicating a set of banks of the target device allowed to host I/O objects of that range constraint type and a RPM constraint type indicating a number of I/O objects within an RPM group. I/O objects, including select I/O objects and clock I/O objects, of the circuit design can be concurrently assigned to I/O groups according to the I/O standard associated with each I/O object. Each I/O group can include only I/O objects having a same range constraint type and a same RPM constraint type.

A plurality of linear constraints for regulating assignment of the I/O groups to banks of the target device can be established. The linear constraints can include at least one location constraint for I/O groups including I/O objects assigned to a specific position within a bank of the target device. Mutual relationships among selected ones of the linear constraints can be defined and an indication as to whether a feasible solution exists for assignment of the I/O groups to banks of the target device can be provided by minimizing a linear objective function while observing the linear constraints and the mutual relationships.

Establishing a plurality of linear constraints can include classifying I/O objects subject to a location constraint as locked I/O objects, determining a number of the locked I/O objects for a bank $B_p$, and decreasing available capacity of bank $B_p$ by the number of locked I/O objects. The method also can include setting $Z_{ip}$ equal to one for bank $B_p$, wherein $Z_{ip}$ indicates whether bank $B_p$ is occupied, setting $Y_{ip}$ equal to one for bank $B_p$, wherein $Y_{ip}$ indicates whether at least one I/O object from an I/O group $G_i$ is assigned to bank $B_p$, setting $Z_{jp}$ equal to zero for all $j \neq i$, and setting $Y_{jp}$ equal to zero if the I/O group $G_j$ is not compatible with the I/O group $G_i$.

In the case where an I/O group $G_i$ has a particular range constraint type and a subset of all banks $B_p$ is not allowed to host the I/O group $G_i$, the method further can include setting a measure of capacity for each bank $B_p$ of the subset of banks with respect to the I/O group $G_i$ equal to zero, setting $Y_{ip}$ equal to zero, wherein $Y_{ip}$ indicates whether at least one I/O object from the I/O group $G_i$ is assigned to bank $B_p$, and setting $X_{ip}$ to zero, wherein $X_{ip}$ indicates a number of I/O objects from the I/O group $G_i$ that are allocated to bank $B_p$.

The method further can include limiting a capacity of a bank to receive an RPM group according to the relationship $$\sum_{i=1}^{M} P_i X_{ip} \leq \sum_{i=1}^{M} C_{ip} Z_{ip},$$

wherein $P_i$ can be a weighting factor corresponding to a number of I/O objects within an RPM group, $X_{ip}$ can indicate a number of I/O objects from a selected I/O group allocated to a selected bank, $C_{ip}$ can indicate a maximum number of I/O objects from the selected I/O group that can be assigned to the selected bank, $Z_{ip}$ is a binary variable that can indicate whether the selected bank is occupied by at least one I/O object, and M represents the total number of I/O groups defined for the circuit design.

Another embodiment of the present invention can include a machine readable storage medium having stored thereon a computer program having a plurality of code sections executable by a machine for causing the machine to perform the various steps or functions disclosed herein.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein provide technique(s) for solving Select I/O placement problems for a wide variety of I/O objects. The feasibility of a given circuit design, or problem instance, can be determined with respect to the Select I/O placement problem. More particularly, the feasibility of assigning I/O objects to banks of an integrated circuit (IC), such as a field programmable gate array (FPGA) or other device having programmable logic, can be determined. The embodiments disclosed herein can be used to evaluate circuit designs to be implemented on ICs having mixed capacity banks, meaning that each bank need not have, or be assumed to have, a same number of sites available for I/O objects.

The embodiments disclosed herein further address a variety of other real-world concerns and constraints. More particularly, the embodiments address the situation in which an I/O object of a particular I/O standard is not to be included within a particular bank for one reason or another. Constraints relating to location and range, as applied to I/O objects can be observed as well as limitations relating to the inclusion of an I/O object within a relationally placed macro (RPM). The embodiments disclosed herein also provide an integrated approach, in which the I/O system, inclusive of the Select I/O subsystem and the Clock I/O subsystem, is considered as a whole rather than independently.

Figure 1:
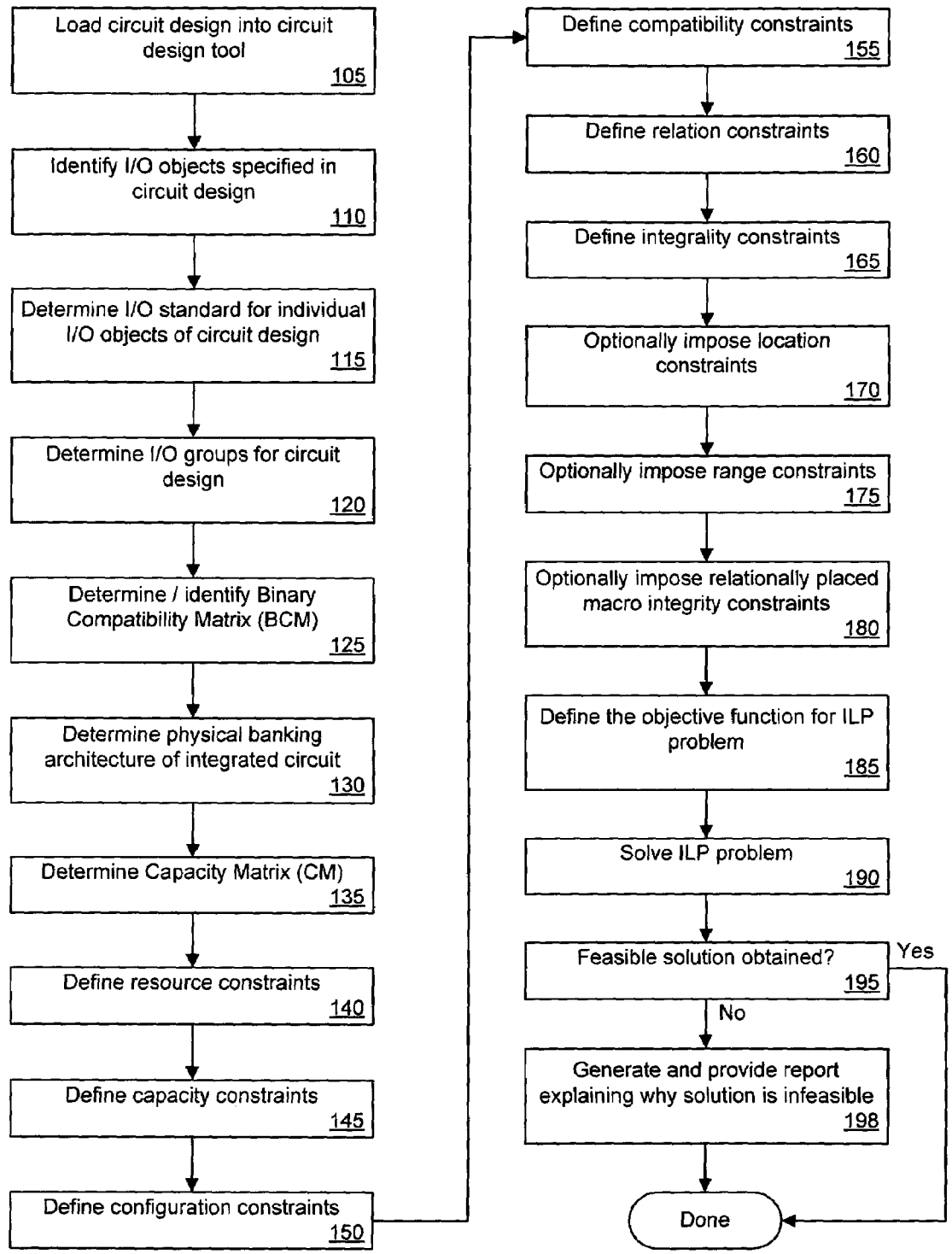
FIG. 1 is a flow chart illustrating a method of determining the feasibility of input/output placement in relation to a circuit design for an integrated circuit in accordance with one embodiment of the present invention.

FIG. 1 is a flow chart illustrating a method of determining the feasibility of I/O object placement in relation to a circuit design for an IC in accordance with one embodiment of the present invention. The steps described herein can be implemented within a software-based circuit design tool executing within a suitable information processing system. Such circuit design tools can operate upon software-based or programmatic representations of circuit designs including, but not limited to, netlists, hardware description language representations, or, in some cases, high level programming language representations (hereafter collectively referred to as "circuit design").

Beginning in step 105, a circuit design for an IC can be loaded into a circuit design tool as described above. While the circuit design can be for any of a variety of different ICs, in one embodiment, the circuit design can be for an FPGA. In step 110, the various I/O objects specified or defined by the circuit design can be identified by the circuit design tool. As used herein, an I/O object can refer to an I/O instance, such as an I/O block (IOB), in the loaded circuit design.

In step 115, the particular I/O standard, denoted as $S_i$, to which each I/O object identified in step 110 is to conform can be determined. The I/O standard corresponding to each I/O object can be extracted, or ascertained, from an examination of the circuit design. As noted, an I/O standard defines the set of properties or attributes that any I/O object must possess if considered to conform, or "be of", that I/O standard. Examples of common I/O standards can include, but are not limited to, LVCMOS25, LVDS25, PCI33_3, GTL, GTL_DCI, GTLP_DCI, HSTL_I_D, LVDCI_18, and LVDCI_33. This listing is not intended to be exhaustive, but rather serve as an illustration of the many different I/O standards that are available which dictate the parameters ascribed to an I/O object.

Each I/O standard $S_i$ can dictate a set of parameters as well as the values assigned to those parameters. By classifying an I/O object as corresponding, or belonging, to a particular I/O standard, the I/O object is associated with the attributes and attribute values corresponding to that I/O standard. In one embodiment, the set of attributes defined by an I/O standard can include, but are not limited to, I/O Standard Name, Reference Voltage ($V_{REF}$), Output Voltage ($V_{CCO}$), Termination Type, and Direction Type. Possible values for Termination Type can include, but are not limited to, SPLIT, SINGLE, DRIVER, and NONE. Possible values for Direction Type can include, but are not limited to, INPUT, OUTPUT, and BIDIRECTIONAL.

Table 1 below provides a listing of exemplary attributes and attribute values for different I/O standards. The letters "NR", as used herein, stand for "not relevant" and indicate the ability of a given I/O standard to accommodate a variety of different values for a specified attribute.

TABLE 1

| I/O Standard Name | $V_{REF}$ (Volts) | $V_{CCO}$ (Volts) | $V_{CCO}$ (Volts) | Termination Type |
|---|---|---|---|---|
| LVCMOS25 | NR | 2.5 | 2.5 | NR |
| LVDS25 | NR | NR | 2.5 | NR |
| PCI33_3 | NR | 3.3 | 3.3 | NR |
| GTL | 0.8 | NR | NR | NR |
| GTL_DCI | 0.8 | 1.2 | 1.2 | Single |
| GTLP_DCI | 1.0 | 1.5 | 1.5 | Single |
| HSTL_I_D | 0.75 | 1.5 | 1.5 | Split |
| LVDCI_18 | NR | NR | 1.8 | Driver |
| LVDCI_33 | NR | NR | 3.3 | Driver |

The clock I/O objects have to be assigned to only those I/O banks that have dedicated clock I/O sites. In one embodiment, this can be accomplished by introducing range constraints for all of the clock I/O objects. The newly introduced range constraints specify those I/O banks that can accommodate a clock I/O object. In one embodiment, the range constraints consist of at least one rectangular region on the FPGA device, a region being the area covered by one or more I/O banks.

Thus, in another embodiment, the set of attributes defined by an I/O standard $S_i$ further can include a range constraint type (RCType) and an RPM constraint type (RPMType). Often, I/O objects, including clock I/O objects, are characterized by a set of associated rectangular windows defined on the target IC or FPGA device. Each rectangular window defines an area on the target device where a given I/O object can be placed. This effectively limits the available sites to which the I/O object can be located. The rectangular windows typically are created to accommodate a variety of design constraints including, but not limited to, timing requirements, congestion, or other user imposed constraints. If a given I/O object is associated with more than one rectangular window, the available sites to which that I/O object can be located are those located in the union of the rectangular windows associated with that I/O object. In any case, these available sites can be mapped to particular banks of the target device effectively defining a range, or set, of banks that are available to host a given I/O object.

The set of available banks can be expressed as the range constraint RCType. The RCType can identify a distinct range constraint for the circuit design. RCType can identify the set of banks that is allowed to host a given I/O object that has a range constraint corresponding to RCType. If RCType is assigned a value of zero for a given I/O standard $S_i$, the I/O objects of that I/O standard can be assigned to any bank on the target device.

If assignment of an I/O standard will be restricted to a set of banks of the target device, the RCType for that I/O standard can be assigned some positive integer. The positive integer number can be an index number that identifies the set of banks of the target device to which I/O objects of the I/O standard $S_i$ can be assigned. In the case where two I/O standards have different RCTypes, each I/O standard can be considered to be completely disjoint.

The RPMType can specify the number of I/O objects included as part of an RPM group. An RPM, as used herein, can refer to a set of components and/or blocks of a circuit design that have predetermined, relative coordinates with respect to one another. The collection of components forming the RPM generally is moved and treated as a single, larger component. In terms of banks of a target device, it often is the case that the I/O objects of an RPM must be assigned to the same bank, without being separated. The splitting of I/O objects of an RPM to different banks is not permitted. Accordingly, a default value of one can be assigned to the RPMType parameter for single I/O objects that are not included within an RPM. Many I/O related RPMs, such as LVDS pairs, have an RPMType equal to 2. Only the I/O objects with the same RPMType can be combined to form an I/O group.

The parameters listed herein in relation to I/O standards are not intended to limit the present invention. Additional parameters and/or parameter values can be used, or incorporated, as new architectures evolve.

Identifying the I/O standard for the I/O objects of the circuit design is useful in determining the feasibility of a circuit design with respect to the I/O placement solution. The attributes of the I/O objects, as dictated by the I/O standard for each I/O object, can be taken into consideration. Compatibility rules, or constraints, relating to the placement of I/O objects can be specified based upon the set of parameters for each of the I/O standards. These constraints indicate whether I/O objects of given I/O standards can be placed within a same bank of the IC. I/O objects placed within a same bank should have all of their attributes, for example voltage requirements, be compatible with each other.

In step 120, I/O groups can be determined for the circuit design. Each I/O group can represent one or more I/O objects that should obey a similar set of compatibility constraints. In one embodiment, each I/O group, denoted as $G_i$, can be defined as the set $G_i=\{S_i, N_i\}$, where i=1, ..., M, and M represents the total number of I/O groups for the circuit design. The variable $N_i$ can represent the total number of individual I/O objects that have the same I/O standard $S_i$.

From the discussion relating to RCType and RPMType above, it should be appreciated that any I/O group can include only I/O objects that have the same I/O standard and also the same RCType and the same RPMType.

In step 125, a Binary Compatibility Matrix (BCM) can be determined or identified. In one embodiment, the BCM can be generated according to those I/O standards identified in the circuit design that is being processed. In another embodiment, the BCM can be predetermined and stored as a lookup table or other data structure as the attributes of many I/O standards are known and readily available.

In any case, the BCM is a matrix having a plurality of elements, $A_{ij}$. Each element $A_{ij}$ indicates the compatibility of one I/O group $G_i$ with respect to another I/O group $G_j$. If $A_{ij}=1$, the corresponding I/O groups are said to be compatible and can be placed in a same bank of the IC. As discussed, compatibility among different I/O groups is directly related to the individual attributes for each I/O standard.

The BCM can be formulated by observing a plurality of rules pertaining to I/O standard compatibility. One rule is that the voltages needed for $V_{REF}$ and $V_{CC}$ that are required by a given I/O standard must be compatible if I/O objects of the two I/O standards are to be placed in a same bank. That is, all I/O objects assigned to a same bank, must correspond to an I/O standard having the same fixed $V_{REF}$ and $V_{CC}$ requirements or to an I/O standard that has an undefined value, denoted as "NR" in Table 1.

When considering compatibility within banks, the direction of IOBs must be considered. IOBs programmed bi-directionally, which use both input and output buffers, use an I/O standard which allows for bi-directional programming. Depending upon the direction, some attributes, such as $V_{REF}$ or $V_{CCO}$ voltage or terminate types, may be different. These attributes should be accounted for as only compatible I/O objects can be assigned to the same bank.

Another rule is that the terminate type also must be compatible within the same Bank. Only one I/O standard having a terminate type of SINGLE can be programmed per bank. Only one I/O standard having a terminate type of SPLIT can be programmed per bank. Terminate types of SINGLE and SPLIT can co-exist in a same bank. Terminate types NONE and DRIVER are not restricted to being the only terminate type within a given bank. Thus, terminate types NONE and DRIVER can co-exist with types SPLIT and SINGLE.

Using these rules, it can be seen that $A_{ij}=0$ indicating that I/O group $G_i$ is not compatible with I/O group $G_j$ if the following constraints are met. If I/O groups $G_i$ and $G_j$ require different definite values for $V_{REF}$ and/or $V_{CC}$, then $A_{ij}=0$. If I/O groups $G_i$ and $G_j$ have different I/O standards and both require special termination types of SINGLE or SPLIT, then $A_{ij}=0$.

For purposes of illustration, Table 2 below shows the compatibility of some known I/O standards.

TABLE 2

|  | LVCMOS25 | LVDS25 | PCI33_3 | GTL | GTL_DCI | GTLP_DCI | HSTL_I_D | LVDCI_18 | LVDCI_33 |
|---|---|---|---|---|---|---|---|---|---|
| LVCMOS25 | 1 | 1 | 0 | 1 | 0 | 0 | 0 | 0 | 0 |
| LVDS25 | 1 | 1 | 0 | 1 | 0 | 0 | 0 | 0 | 0 |
| PCI33_3 | 0 | 0 | 1 | 1 | 0 | 0 | 0 | 0 | 1 |
| GTL | 1 | 1 | 1 | 1 | 1 | 0 | 0 | 0 | 1 |
| GTL_DCI | 0 | 0 | 0 | 1 | 1 | 0 | 0 | 0 | 0 |

TABLE 2-continued

| | LVCMOS25 | LVDS25 | PCI33_3 | GTL | GTL_DCI | GTLP_DCI | HSTL_I_D | LVDCI_18 | LVDCI_33 |
|---|---|---|---|---|---|---|---|---|---|
| GTLP_DCI | 0 | 0 | 0 | 0 | 0 | 1 | 0 | 0 | 0 |
| HSTL_I_D | 0 | 0 | 0 | 0 | 0 | 0 | 1 | 0 | 0 |
| LVDCI_18 | 0 | 0 | 0 | 0 | 0 | 0 | 0 | 1 | 0 |
| LVDCI_33 | 0 | 0 | 1 | 1 | 0 | 0 | 0 | 0 | 1 |

In step 130, the physical banking architecture of the IC can be determined. Modern ICs typically provide multiple banks for grouping I/O sites as has been noted. Each bank, denoted as $B_p$ where p=1, ..., N and N is the total number of banks on the IC, can be characterized by a set of resources, or parameters. These parameters collectively define the banking architecture of the IC and can be ascertained, or known, by identifying the particular type, i.e. brand and/or model, of IC within which the circuit design is to be implemented. In any case, these parameters can include, but are not limited to, the number of regular I/O pins, denoted as $N_{reg}$, in each bank; the number of special $V_{ref}$ pins, denoted as $N_{vref}$, in each bank; and the number of special $V_r$ pins, denoted as $N_{vr}$, in each bank.

Regular I/O pins can be used to provide signals to I/O objects. By comparison, special pins, in reference to $V_{ref}$ and $V_r$ pins, can be used to supply additional resources to I/O objects assigned to the bank(s) in which such pins reside. $V_{ref}$ and $V_r$ pins have a feature which allows the pins to function as regular I/O pins if the I/O objects assigned to the bank do not require a specific reference voltage or special termination type such as SPLIT, SINGLE, or DRIVER. The flexible nature of the special pins can lead to situations in which banks have different capacities depending upon which I/O objects and corresponding standards have been assigned to the bank.

In general, step 130 determines an upper boundary of the capacity for each bank. In accordance with the embodiments disclosed herein, an optimal configuration for the banks can be determined. To satisfy the number of I/Os required and specified constraints, $V_{ref}$ and $V_r$ pins can automatically be selected for use as special purpose pins or as regular I/O. Step 130 effectively enumerates the number of special pins in each bank, from which a capacity of the bank can be determined.

In step 135, a Capacity Matrix (CM) can be determined. The CM includes a plurality of elements with each element being denoted as $C_{ip}$. Each element of the CM indicates the maximum number of I/O objects from a given group $G_i$ that can be assigned to a given bank $B_p$. The CM can be defined such that each element is a positive integer. The value of the integer can differ for each bank. By allowing each element $C_{ip}$ to differ, flexibility is added since each bank need not be assumed to have the same capacity.

The CM also facilitates the imposition of other constraints on I/O object placement with regard to limiting the available banks to which selected I/O objects can be assigned. Assigning a value of zero to the appropriate CM element effectively makes a given bank unavailable to a particular I/O group. In illustration, if a given bank $B_p$ lacks a $V_{ref}$ pin or a $V_r$ pin, the bank $B_p$ cannot support I/O objects that require specific values for these parameters ($V_{ref}$ and $V_r$). In such cases, the bank capacity $C_{ip}$ of that bank can be set to zero indicating that the bank has no capacity for I/O objects of group $G_i$.

From the above illustration, it should be appreciated that by appropriately setting $C_{ip}$ to zero, the assignment of a given I/O object to one or more different banks can be prevented. This also allows the imposition of range constraints where an I/O object is permitted in a subset of banks. For example a range constraint may allow I/O objects of group $G_i$ to use only banks 1, 2, and 3, but not banks 4, 5, or 6 of a given device. In that case, the value of $C_{ip}$ for p=4,5,6 is set to zero, i.e. $C_{i4}=C_{i5}=C_{i6}=0$.

Prior to continuing with FIG. 1, several variables which will be used in the ILP formulation of the select I/O problem disclosed herein should be discussed. The first variables are integer type variables referred to as "Group Assignment Variables". Group Assignment Variables can be denoted as $X_{ip}$, where i=1, ..., M in reference to the I/O groups and p=1, ..., N in reference to the I/O banks. Each Group Assignment Variable $X_{ip}$ can define the number of I/O objects of an I/O group $G_i$ assigned to a bank $B_p$. From the I/O group definition already discussed, it can be seen that $X_{ip}$ can be within the interval from 0, where no I/O objects of Group $G_i$ are assigned to a bank, to $N_i$, where all I/O objects of group $G_i$ are assigned to the same bank. The Group Assignment Variables can be defined according to the relationship $0 \leq X_{ip} \leq N_i$.

Next are additional binary variables, referred to as "Bank Color Assignment Variables", can be defined. The Bank Color Assignment Variables can be denoted as $Y_{ip}$, where i=1, ..., M in reference to the I/O groups and p=1, ..., N in reference to the I/O banks. Bank Color Assignment Variables indicate whether at least one I/O object from an I/O group $G_i$ is assigned to a bank $B_p$. The Bank Color Assignment Variables function as utility variables which can simplify the ILP formulation discussed herein. As these variables are binary, the value of each can be 0 or 1 with the variables being defined by the relationship $0 \leq Y_{ip} \leq 1$. As per the discussion above, $Y_{ip}=0$ if $X_{ip}=0$ and $Y_{ip}=1$ if $X_{ip}>0$.

Finally, binary variables referred to as "Bank Assignment Variables" can be defined. The Bank Assignment Variables can be denoted as $Z_{ip}$, where i=1, ..., M in reference to the I/O groups and p=1, ..., N in reference to the I/O banks. Bank Assignment Variables define whether a given bank $B_p$ is occupied. In other words, the Bank Assignment Variables indicate whether the selected bank holds at least one assigned I/O object. The variable $Z_{ip}=1$ if the bank $B_p$ has at least one assigned I/O object with I/O standard $S_i$ or an I/O standard compatible with $S_i$. Otherwise, $Z_{ip}=0$. The I/O standard indicates the $V_{ref}$ and $V_{cco}$ voltages that will be supplied to the bank, as well as which pins are reserved, which are set free, etc. From the above discussion, it can be seen that the Bank Assignment Variables can be defined according to the relationship $0 \leq Z_{ip} \leq 1$. As will be described in further detail, the embodiments disclosed herein allow the automatic choice of $Z_{ip}$ values that allow maximum flexibility for the given circuit design and target device.

Turning again to FIG. 1, a plurality of different constraints can be defined to aid in solving the Select I/O problem. The constraints define relationships that must be observed or enforced when solving the Select I/O problem. Referring to step 140, one or more resource constraints can be defined. In general, all I/O groups can be distributed among all available banks. Recalling that $X_{ip}$ indicates the number of I/O objects from I/O group $G_i$ allocated to bank $B_p$, in order to preserve a total amount of I/O objects in group $G_i$ the following relationship regarding $X_{ip}$ can be established and enforced:

$$\sum_{p=1}^{N} X_{ip} = N_i,$$

where the total number of resource constraints is equal to M and i=1, ..., M. This ensures that the sum of all I/O objects, of a group $G_i$, that are allocated to all banks $B_p$, will equal the total number of I/O objects in the group $G_i$.

In step 145, one or more capacity constraints can be defined. Each bank can hold I/O objects from any I/O groups as long as such I/O groups are compatible. The total number of I/O objects assigned to a given bank, however, must not exceed the capacity of the bank. In other words, for each bank, the sum of contributions from all I/O groups assigned to that bank must not exceed the capacity of the bank. The bank capacity depends upon the bank configuration. Since the bank configuration is not known in advance, the bank capacity can be set to be the sum of all possible capacities for all configurations. Subsequently, the additional restriction that a bank can be configured with only one configuration can be imposed. Such a restriction will mean that only one variable $Z_{ip}$ for a given value of p will be one and the rest will be zero. The relationship can be expressed as $$\sum_{i=1}^{M} X_{ip} \leq \sum_{i=1}^{M} C_{ip} Z_{ip},$$

where $C_{ip}$ indicates the minimum capacity of bank $B_p$ for all I/O standards compatible with the standard $S_i$. Since only one $Z_{ip}$ will be one for a given bank p, only one of the $C_{ip} Z_{ip}$ terms in right hand side of the above expression will actually be non-zero.

In step 150, one or more configuration constraints can be defined. The configuration constraints can exploit the binary nature of $Z_{ip}$. Each bank can be configured according to only one I/O standard. This means that, at most, only one of $Z_{ip}$ can be equal to one. This relationship can be expressed as $$0 \leq \sum_{i=1}^{M} Z_{ip} \leq 1,$$

where p=1, ..., N. The total number of configuration constraints can be equal to N, the total number of I/O banks. The configuration constraints determine the capacity of an I/O bank as discussed herein. In association with the Bank Color Assignment variables $Y_{ip}$, the Bank Assignment variables $Z_{ip}$ allow the ILP solver to automatically choose the best possible configuration for each I/O bank.

In step 155, one or more compatibility constraints can be defined. As discussed, only compatible I/O objects can be assigned to the same bank. Compatibility between different I/O groups is defined by the BCM elements $A_{ij}$. These constraints can be expressed in terms the Bank Color Assignment Variables $Y_{ip}$. In one embodiment, the compatibility constraints can be expressed using the inequalities $Y_{ip} + Y_{jp} \leq 1 +$ $A_{ij}$ for all possible combinations of I/O groups $G_i$ and $G_j$, where i, j=1, ..., M, as well as for all banks $B_p$, where p=1, ..., N.

Recall that $Y_{ip}$ indicates whether at least one I/O object from an I/O group $G_i$ is assigned to an bank $B_p$. According to the compatibility constraint inequality, if $A_{ij}=1$, $Y_{ip}$ and $Y_{jp}$ each can equal one without violating the inequality. This means that the two I/O groups are compatible. If, however, $A_{ij}=0$, then either $Y_{ip}$ or $Y_{jp}$ is forced to zero to maintain the inequality. The Bank Color Assignment Variable that is not forced to zero indicates the I/O standard that is included, or assigned to, the relevant bank. In general, i=1, ..., M; j=1, ..., M; p=1, ..., N. Cases where $A_{ij}=0$ for $Y_{ip}$ or $Y_{jp}$ represent non-trivial cases, i.e. two I/O groups that cannot be assigned to the same bank. The total number of non-trivial compatibility constraints is design dependent and is equal to the total number of BCM elements that are equal to zero.

In step 160, one or more relation constraints can be defined. The constraints described with reference to steps 140-155 act on groups of variables, but do not define mutual relationships among the variables. The relation constraints impose the mutual relationships needed to solve an ILP formulation of the select I/O problem. The relation constraints can be expressed as a set of inequalities. The first relation constraint can be expressed as: $Y_{ip} \leq X_{ip} \leq N_i Y_{ip}$. The second relation constraint can be expressed as: $0 \leq Z_{ip} \leq Y_{ip}$.

From the relation constraint $Y_{ip} \leq X_{ip} \leq N_i Y_{ip}$, it can be seen that if $Y_{ip}=0$, the only allowed value for $X_{ip}$ also is zero. Recall that the Group Assignment Variable $X_{ip}$ indicates the number of I/O objects of I/O group $G_i$ assigned to bank $B_p$. Thus, if $X_{ip}=0$, no I/O objects of I/O group $G_i$ have been assigned to bank $B_p$. Also, if $X_{ip}=0$, then $Y_{ip}=0$. The constraint defines a linear relationship between $X_{ip}$ and $Y_{ip}$.

The relation constraint $0 \leq Z_{ip} \leq Y_{ip}$ indicates that if $Y_{ip}=1$, then the value of $Z_{ip}$ can be 0 or 1. In other words, a configuration of bank $B_p$ to support a given I/O group $G_i$ may result in that I/O group being assigned to the bank. This is not required, however. More particularly, bank $B_p$ instead can be configured with the I/O standard $S_j$ of some other compatible group $G_j$, i.e. I/O standards $S_i$ and $S_j$ are compatible. In any case, the total number of relation constraints can be 2*N*M, where i=1, ..., M and p=1, ..., N.

In step 165, integrality constraints can be defined. The integrality constraints simply require that all $Z_{ip}$ and $Y_{ip}$ be binary variables and that all $X_{ip}$ be integer variables.

Beginning in step 170 and continuing through step 180, additional optional constraints, or relationships, can be imposed. These constraints can deal with location, range, and/or RPMs, for example. In step 170, location constraints optionally can be imposed. Location constraints can be employed when one or more I/O objects from a given I/O group $G_i$ are assigned to specific locations of a bank $B_p$. The imposition of location constraints is discussed in greater detail with reference to FIG. 2. In step 175, range constraints optionally can be imposed. Range constraints can be employed when one or more I/O objects are restricted to being assigned to only one subset of banks and, thus, are forbidden from being assigned to other subsets of banks. The imposition of range constraints is discussed in greater detail with reference to FIG. 3.

In step 180, RPM integrity constraints optionally can be imposed. RPM integrity constraints are imposed when a circuit design incorporates one or more RPM groups that can only be assigned to a given bank $B_p$ as a whole. Such RPM groups can be formed according to the RPM constraint type (RPMType) as discussed with reference to I/O standards. The imposition of RPM integrity constraints is described in greater detail with reference to FIG. 4.

In step 185, an objective function for solving the I/O assignment problem using ILP can be defined. The ILP objective function, denoted as F, can be expressed as:

$$F = \min\left(\sum_{i=1}^{M}\sum_{p=1}^{N} Z_{ip}\right).$$

A bank is utilized if $Z_{ip}=1$ at least one time for the range i=1, ..., M. If the total number of utilzied banks is not larger than the total number of available banks N on the target device, the ILP solution will be feasible.

In step 190, the ILP problem can be solved. The ILP solution can be determined using any of a variety of commercially available, software-based, ILP solvers. Available ILP solvers can include, but are not limited to, LP_Solve, which is a free solver. Other free and commercial solvers also are available. Again, referring to the example, the solver, or an analysis of the constraints set forth herein, can indicate whether a feasible solution exists for the I/O assignment problem.

In step 195, a determination can be made as to whether a feasible solution was determined using the ILP solver. If so, the method can end. If not, the method can continue to step 198, where a report can be provided which explains why the solution is infeasible. After step 198, the method can end.

Figure 2:
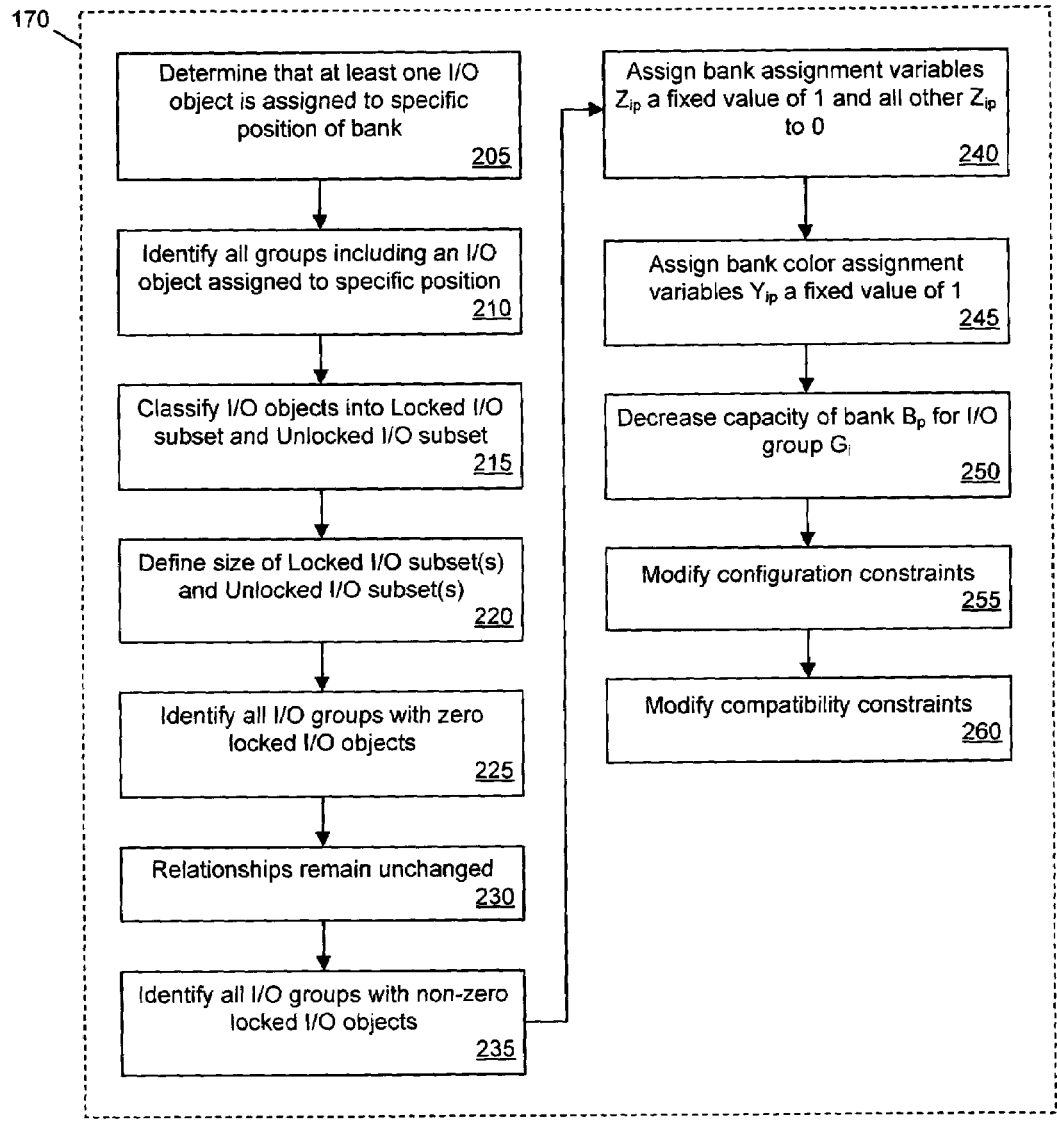
FIG. 2 is a flow chart illustrating step 170 of FIG. 1 in greater detail.

FIG. 2 is a flow chart illustrating step 170 of FIG. 1 in greater detail. FIG. 2 illustrates the imposition of location constraints in accordance with one embodiment of the present invention. As noted, location constraints can be imposed when one or more I/O objects from a given I/O group $G_i$ are assigned to specific locations of a bank $B_p$. Accordingly, in step 205, a determination can be made that at least one I/O object of the circuit design has been assigned to a specific position of a bank of the target device. This can result from a clock I/O object needing to be assigned to a specific location, or site, within a bank that is reserved for clock resources or as a result of a user-specified constraint relating to a clock I/O object or a regular I/O object. In step 210, all I/O groups $G_i$ that include at least one I/O object that has been assigned to a specific location within a bank can be identified.

In step 215, for each I/O group identified in step 210, the I/O objects within such groups can be classified into two disjoint subsets. In particular, the I/O objects can be classified as a Locked I/O or an Unlocked I/O. I/O objects that are assigned to a particular location within a bank can be classified as belonging to the Locked I/O subset. Conversely, I/O objects that are not assigned to particular locations within a bank can be classified as belonging to the Unlocked I/O subset.

In step 220, the size of each subset for each I/O group can be defined. The size is an indication of the number of I/O objects included within the subset. For each I/O group identified in step 210, the number of I/O objects classified as being within the Unlocked I/O subset can be denoted as Ni. The number of I/O objects classified as being within the Locked I/O subset can be denoted as Nil. Both Ni and Nil can be defined as being equal to zero or a positive integer.

In step 225, all I/O groups with Nil=0 can be identified. In step 230, the I/O groups identified in step 225 remain unchanged. More particularly, any relationships defined as discussed with reference to FIG. 1 can remain intact for I/O groups with Nil=0. In step 235, all I/O groups with Nil>0 can be identified. For such groups, the relationships described with reference to FIG. 1 can be modified. Steps 240-260 describe, in greater detail, the modifications to the relationships for I/O groups with Nil>0.

In step 240, the Bank Assignment Variables, denoted as $Z_{ip}$, for I/O groups with Nil>0, can be changed to have a fixed value of one. As noted, $Z_{ip}$ indicates whether a bank $B_p$ is occupied with at least one I/O object. Since the bank $B_p$ includes at least one I/O object, in particular the I/O object specifically assigned to the bank, $Z_{ip}$ has this fixed value of one. If more than one $Z_{ip}$ (for any given p) is one, then this condition can be flagged as a user error caused by locating two or more I/O objects with incompatible I/O standards in the same bank.

In step 245, the Bank Color Assignment Variables, denoted as $Y_{ip}$, for I/O groups with Nil>0, can be changed to have a fixed value of one. $Y_{ip}$ indicates whether at least one I/O object from an I/O group $G_i$ has been assigned to a bank $B_p$. Since the bank $B_p$ has at least one I/O object from the I/O group $G_i$, i.e. the I/O object assigned a particular location within bank $B_p$, $Y_{ip}$ is set equal to one.

With these modifications in mind, the Group Assignment Variables $X_{ip}$ can define the number of I/O objects from the Unlocked I/O subset of the I/O group $G_i$ that is assigned to the bank $B_p$. As noted, $X_{ip}$ is defined as an integer variable. In this embodiment, where location constraints are imposed, the value of $X_{ip}$ can range from zero to Ni. Accordingly, in step 250, the capacity of the bank $B_p$ for I/O group $G_i$ can be decreased by a quantity $L_{ip}$, which represents the number of I/O objects from the I/O group $G_i$ that are locked to the bank $B_p$. Thus, the capacity for a bank $B_p$ can be expressed as $C_{ip}-L_{ip}$.

In step 255, the configuration constraints described with reference to step 150 of FIG. 1 can be modified. In particular, the Bank Assignment Variables $Z_{jp}$ can be modified such that $Z_{jp}=0$ for all j≠i. In step 260, the compatibility constraints described with reference to step 155 of FIG. 1 can be modified. The Bank Color Assignment Variables $Y_{jp}$ can be modified such that $Y_{jp}=0$ if the I/O group $G_j$ is not compatible with $G_i$.

In general, if multiple I/O objects are locked to the same bank, the I/O groups associated with such I/O objects should be compatible. As can be noted from FIG. 2, each locked I/O object effectively decreases the total complexity of the problem by reducing the number of independent variables and regular constraints. This leads to a less complex ILP solution.

Figure 3:
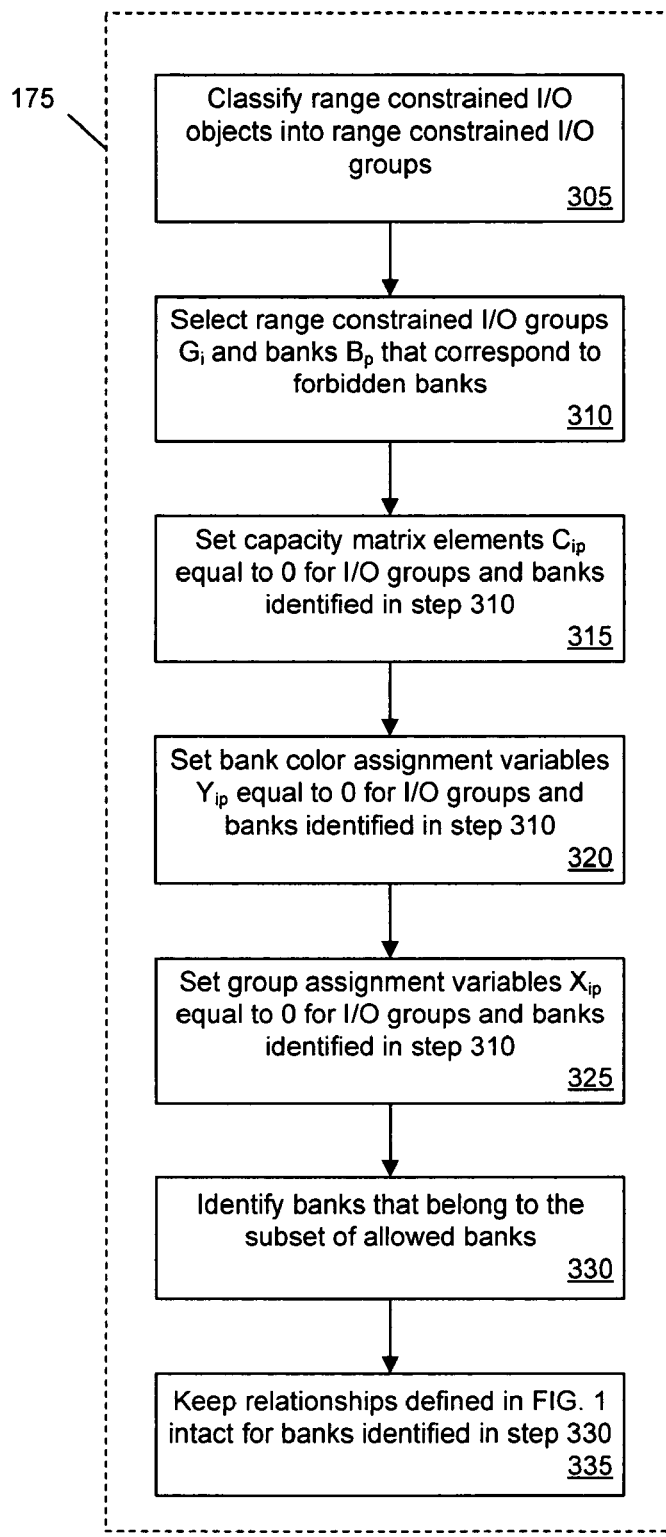
FIG. 3 is a flow chart illustrating step 175 of FIG. 1 in greater detail.

FIG. 3 is a flow chart illustrating step 175 of FIG. 1 in greater detail. More particularly, FIG. 3 illustrates the manner in which range constraints can be imposed in accordance with one embodiment of the present invention. As discussed, range constraints can be employed when one or more I/O objects are restricted to being assigned to only one subset of banks and, thus, are forbidden from being assigned to other subset(s) of banks.

In step 305, all I/O objects that are range constrained can be grouped into range constrained I/O groups. Range constrained I/O groups can be distinguished by the parameter RCType as well as by other attributes as discussed with reference to I/O standards in FIG. 1. In step 310, all range constrained I/O groups $G_i$ can be selected as well as all banks $B_p$ that belong to the subset of forbidden banks. Various parameters can be modified for these I/O groups and banks as will be described with reference to steps 315-325.

Recalling that elements $C_{ip}$ of the capacity matrix indicate the maximum number of I/O objects from a group $G_i$ that can be assigned to a bank $B_p$, in step 315, the elements of the capacity matrix that correspond to the I/O groups and banks identified in step 310 can be set equal to zero. Since these banks are unable to receive I/O objects from the identified I/O groups, the capacity of each bank concerning the identified I/O groups is set to zero.

In step 320, the bank color assignment variables $Y_{ip}$ corresponding to the I/O groups and banks identified in step 310 can be set equal to zero. The bank color assignment variables $Y_{ip}$ define whether at least one I/O object from an I/O group $G_i$ is assigned to a bank $B_p$. In step 325, the group assignment variables $X_{ip}$ corresponding to the I/O groups and banks identified in step 310 can be set equal to zero. Recall that the group assignment variables $X_{ip}$ define the number of I/O objects of I/O group $G_i$ assigned to bank $B_p$. Forcing these variables to zero effectively restricts the range of available banks to which range constrained I/O objects, and thus range constrained I/O groups, can be assigned.

In step 330, all banks that belong to the subset of allowed banks can be identified. In step 335, the relationships that were defined with reference to FIG. 1 for the allowed banks can remain intact. Other I/O objects compatible with I/O group $G_i$ can be assigned to the same subset of banks. By allowing the elements of the capacity matrix to take on different values including zero, range constraints can be accommodated. Moreover, imposition of range constraints can simplify the select I/O problem in that the number of independent variables is reduced.

Figure 4:
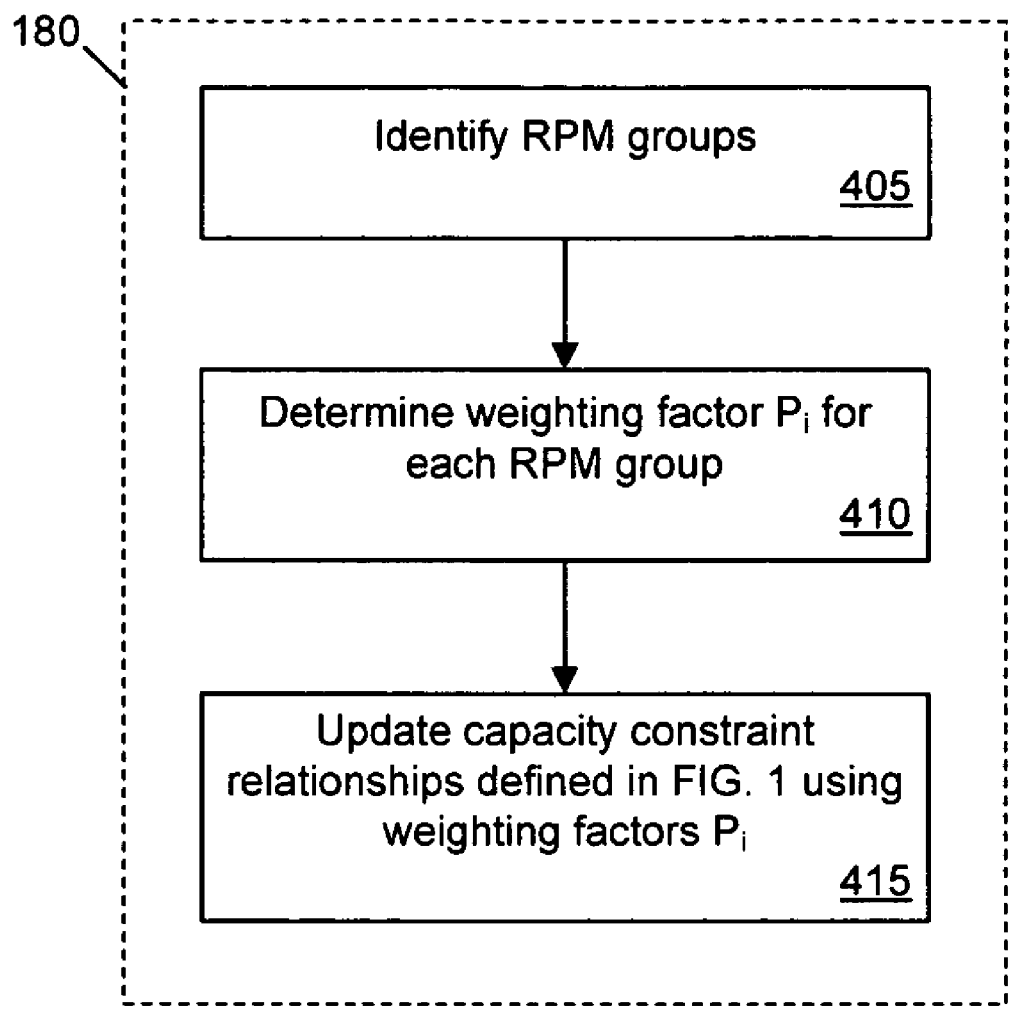
FIG. 4 is a flow chart illustrating step 180 of FIG. 1 in greater detail.

FIG. 4 is a flow chart illustrating step 180 of FIG. 1 in greater detail. FIG. 4 illustrates the manner in which relationally placed macro integrity constraints can be applied in accordance with one embodiment of the present invention. As noted, an RPM can refer to a set of components and/or blocks of a circuit design that have predetermined, relative coordinates with respect to one another and, as such, are treated as a single, larger component. The existence of an RPM with I/O objects can result in the requirement that the I/O objects of the RPM must be assigned to the same bank of the target device. In any case, an RPM constraint can be imposed when a circuit design incorporates one or more RPM groups that can only be assigned to a given bank $B_p$ as a whole. The RPM Type parameter can be determined according to the structure of the RPM groups as has been discussed with reference to FIG. 1.

In step 405, any RPM groups of the circuit design can be identified. The RPM groups are defined such that each I/O group $G_i$ can include only RPM objects of the same size, i.e. RPM objects with the same number of I/O objects, and RPM objects having the same I/O standard. Each RPM groups can be considered as a single I/O object with an additional weighting parameter. In step 410, the weighting parameter $P_i$ for each RPM group can be ascertained. While the weighting factor $P_i$ can be determined in a variety of different ways, in one embodiment, the weighting parameter $P_i$ can be set equal to the number of I/O objects included in the RPM. For I/O objects not included within an RPM, the weighting factor $P_i$ can be set equal to one. Defined in this manner, the weighting factor $P_i$ can be restricted to taking on positive integer values and zero.

In step 415, the capacity constraint that was defined in FIG. 1 can be modified using the weighting factor $P_i$. The capacity constraint can be updated as $$\sum_{i=1}^{M} P_i X_{ip} \leq \sum_{i=1}^{M} C_{ip} Z_{ip}.$$

As can be seen from the modified capacity constraint, the weighting factor $P_i$ has been introduced with the group assignment variable $X_{ip}$ to effectively increase the count of I/O objects assigned to a bank according to the number of I/O objects in the RPM.

The embodiments described herein present a technique for solving select I/O placement problems using an ILP-based technique. The present invention addresses select I/O placement problems involving a variety of different "real-world" problems such as constraints relating to mixed-capacity banks, I/O objects having location and/or range constraints, as well as constraints relating to the use of RPMs within a circuit design.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, and executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e. open language.

This invention can be embodied in other forms without departing from the spirit or essential attributes thereof. Accordingly, reference should be made to the following claims, rather than to the foregoing specification, as indicating the scope of the invention.

What is claimed is:

1. A method of assigning I/O objects to banks of a target device, the method comprising:
concurrently assigning I/O objects, comprising select I/O objects and clock I/O objects, of the circuit design to I/O groups according to an I/O standard associated with each I/O object, wherein each I/O group includes only I/O objects of a same I/O standard;
establishing a plurality of linear constraints for regulating assignment of the I/O groups to banks of the target device, wherein the linear constraints comprise range constraints indicating I/O banks capable of hosting clock I/O objects;
defining mutual relationships among selected ones of the linear constraints; and indicating whether a feasible solution exists for assignment of the I/O groups to banks of the target device by minimizing a linear objective function while observing the linear constraints and the mutual relationships.

2. The method of claim 1, wherein establishing a plurality of linear constraints comprises defining at least one location constraint for an I/O group that indicates a position to which an I/O object of the I/O group is to be assigned within a selected bank of the target device.

3. The method of claim 1, wherein establishing a plurality of linear constraints comprises defining a least one location constraint for an I/O group that indicates a position to which a clock I/O object of the I/O group is to be assigned within a selected bank of the target device.

4. The method of claim 2, wherein the plurality of linear constraints comprises a capacity constraint for the selected bank, the method further comprising:
classifying I/O objects assigned to a position of the selected bank as locked I/O objects;
determining a number of locked I/O objects for the selected bank; and
modifying the capacity constraint by decreasing available capacity of the selected bank by the number of locked I/O objects for the selected bank.

5. The method of claim 1, wherein the I/O standard for each I/O object has a range constraint type indicating a set of banks of the target device allowed to host the I/O objects of that range constraint type, and wherein concurrently assigning I/O objects further comprises assigning I/O objects to I/O groups such that each I/O group includes only I/O objects having a same range constraint type.

6. The method of claim 5, further comprising setting a measure of capacity, a bank color assignment variable, and a group assignment variable, relating to a selected I/O group, to zero for each bank that is not allowed to host the selected I/O group.

7. The method of claim 1, wherein the I/O standard for each I/O object specifies a relationally placed macro (RPM) constraint type indicating a number of I/O objects within an RPM group, wherein concurrently assigning I/O objects further comprises assigning I/O objects to I/O groups such that each I/O group includes only I/O objects having a same RPM constraint type.

8. The method of claim 7, further comprising limiting a measure of capacity of a bank to receive an RPM group using a weighting factor that depends upon RPM constraint type.

9. A method of assigning I/O objects to banks of a target device, the method comprising:
specifying I/O standards to include a range constraint type indicating a set of banks of the target device allowed to host I/O objects of that range constraint type and a relationally placed macro (RPM) constraint type indicating a number of I/O objects within an RPM group;
concurrently assigning I/O objects, comprising select I/O objects and clock I/O objects, of the circuit design to I/O groups according to the I/O standard associated with each I/O object such that each I/O group includes only I/O objects having a same range constraint type and a same RPM constraint type;
establishing a plurality of linear constraints for regulating assignment of the I/O groups to banks of the target device, wherein the plurality of linear constraints comprises at least one location constraint for I/O groups including I/O objects assigned to a specific position within a bank of the target device;
defining mutual relationships among selected ones of the linear constraints; and
indicating whether a feasible solution exists for assignment of the I/O groups to banks of the target device by minimizing a linear objective function while observing the constraints and the mutual relationships.

10. The method of claim 9, wherein establishing a plurality of linear constraints comprises:
classifying I/O objects subject to a location constraint as locked I/O objects;
determining a number of the locked I/O objects for a bank $B_p$; and
decreasing available capacity of the bank $B_p$ by the number of locked I/O objects.

11. The method of claim 10, further comprising:
setting $Z_{ip}$ equal to one for bank $B_p$, wherein $Z_{ip}$ indicates whether bank $B_p$ is occupied;
setting $Y_{ip}$ equal to one for bank $B_p$, wherein $Y_{ip}$ indicates whether at least one I/O object from an I/O group $G_i$ is assigned to bank $B_p$;
setting $Z_{jp}$ equal to zero for all $j \neq i$; and
setting $Y_{jp}$ equal to zero if the I/O group $G_j$ is not compatible with the I/O group $G_i$.

12. The method of claim 9, wherein for I/O groups $G_i$ having a particular range constraint type and all banks $B_p$ that belong to a subset of banks not allowed to host the I/O groups $G_i$, the method further comprises:
setting a measure of capacity for each bank $B_p$ of the subset of banks, with respect to the I/O groups $G_i$, equal to zero;
setting $Y_{ip}$ equal to zero, wherein $Y_{ip}$ indicates whether at least one I/O object from an I/O group $G_i$ is assigned to bank $B_p$; and
setting $X_{ip}$ to zero, wherein $X_{ip}$ indicates a number of I/O objects from an I/O group $G_i$ that are allocated to bank $B_p$.

13. The method of claim 9, further comprising limiting a capacity of a bank to receive an RPM group according to the relationship $$\sum_{i=1}^{M} P_i X_{ip} \leq \sum_{j=1}^{M} C_{ip} Z_{ip},$$

where $P_i$ is a weighting factor corresponding to a number of I/O objects within an RPM group, $X_{ip}$ indicates a number of I/O objects from a selected I/O group that are allocated to a selected bank, $C_{ip}$ indicates a maximum number of I/O objects from the selected I/O group that can be assigned to the selected bank, $Z_{ip}$ is a binary variable that indicates whether the selected bank is occupied by at least one I/O object, and M represents the total number of I/O groups defined for the circuit design.

14. A machine readable storage medium having stored thereon a computer program having a plurality of code sections for causing a computer to assign input/output objects of a circuit design to banks of a target device, the machine readable storage medium comprising:
code for concurrently assigning I/O objects, comprising select I/O objects and clock I/O objects, of the circuit design to I/O groups according to an I/O standard associated with each I/O object, wherein each I/O group includes only I/O objects of a same I/O standard;
code for establishing a plurality of linear constraints for regulating assignment of the I/O groups to banks of the target device, wherein the linear constraints comprise range constraints indicating I/O banks capable of hosting clock I/O objects;

code for defining mutual relationships among selected ones of the linear constraints; and code for indicating whether a feasible solution exists for assignment of the I/O groups to banks of the target device by minimizing a linear objective function while observing the linear constraints and the mutual relationships.

15. The machine readable storage medium of claim 14, wherein the code for establishing a plurality of linear constraints further comprises code for defining at least one location constraint for an I/O group that indicates a position to which an I/O object of the I/O group is to be assigned within a selected bank of the target device.

16. The machine readable storage medium of claim 14, wherein the code for establishing a plurality of linear constraints further comprises code for defining at least one location constraint for an I/O group that indicates a position to which a clock I/O object of the I/O group is to be assigned within a selected bank of the target device.

17. The machine readable storage medium of claim 15, wherein the plurality of linear constraints further comprises a capacity constraint for the selected bank, the machine readable storage medium further comprising:

code for classifying I/O objects assigned to a position of the selected bank as locked I/O objects;

code for determining a number of locked I/O objects for the selected bank; and code for modifying the capacity constraint by decreasing available capacity of the selected bank by the number of locked I/O objects for the selected bank.

18. The machine readable storage medium of claim 14, wherein the I/O standard for each I/O object has a range constraint type indicating a set of banks of the target device that is allowed to host the I/O objects of that range constraint type, wherein the code for concurrently assigning I/O objects comprises code for assigning I/O objects to I/O groups such that each I/O group includes only I/O objects having a same range constraint type.

19. The machine readable storage medium of claim 14, wherein the I/O standard for each I/O object specifies a relationally placed macro (RPM) constraint type indicating a number of I/O objects within an RPM group, wherein the code for concurrently assigning I/O objects comprises code for assigning I/O objects to I/O groups such that each I/O group includes only I/O objects having a same RPM constraint type.

20. The machine readable storage medium of claim 19, further comprising code for limiting a measure of capacity of a bank to receive an RPM group according to a weighting factor that depends upon RPM constraint type.

* * * * *